(12) United States Patent
Seo

(10) Patent No.: US 7,889,435 B2
(45) Date of Patent: Feb. 15, 2011

(54) IMAGING DEVICE HAVING A DUAL LENS OPTICAL SYSTEM

(75) Inventor: Jung-pa Seo, Kimhae-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/621,695

(22) Filed: Nov. 19, 2009

(65) Prior Publication Data

US 2010/0066894 A1 Mar. 18, 2010

Related U.S. Application Data

(63) Continuation-in-part of application No. 11/974,874, filed on Oct. 16, 2007, now Pat. No. 7,667,897.

(30) Foreign Application Priority Data

Oct. 17, 2006 (KR) .................. 10-2006-0101030

(51) Int. Cl.
*G02B 15/02* (2006.01)
*G02B 17/00* (2006.01)

(52) U.S. Cl. ................ 359/672; 359/726; 359/737; 396/73

(58) Field of Classification Search ......... 359/672–706, 359/726–737; 396/72–88; 348/240.99–240.3, 348/335–369
See application file for complete search history.

(56) References Cited

U.S. PATENT DOCUMENTS

| 5,940,126 | A | 8/1999 | Kimura |
| 6,532,035 | B1 | 3/2003 | Saari et al. |
| 6,992,699 | B1 | 1/2006 | Vance et al. |
| 7,667,897 | B2 * | 2/2010 | Seo .............................. 359/672 |
| 2001/0017661 | A1 | 8/2001 | Shono |
| 2009/0051804 | A1 | 2/2009 | Nomura et al. |
| 2009/0122179 | A1 | 5/2009 | Nomura et al. |

FOREIGN PATENT DOCUMENTS

| JP | 02-262632 A | 10/1990 |
| JP | 10-254055 A | 9/1998 |
| JP | 2005-101729 A | 4/2005 |
| JP | 2006-064958 A | 3/2006 |
| JP | 2006-081089 A | 3/2006 |
| KR | 1993-0010597 A | 6/1993 |
| KR | 1995-0007036 B1 | 6/1995 |

OTHER PUBLICATIONS

Office Action established for CN200710180848.7.

\* cited by examiner

*Primary Examiner*—Darryl J Collins
(74) *Attorney, Agent, or Firm*—Drinker Biddle & Reath LLP

(57) ABSTRACT

A dual lens optical system includes a first optical system redirecting an optical axis of light representing an image of an object by 90° to form an image on a image sensor, and a second optical system having a movable reflection member configured to be selectively positioned on the part of the redirected optical axis of the optical axis of light passing through the first optical system, and redirecting the light representing the image of the object by 90° using the movable reflection member to form an image on the image sensor, wherein the first optical system and the second optical system share lenses and the image sensor located after the movable reflection member along an optical path.

27 Claims, 15 Drawing Sheets

IMAGING DEVICE HAVING A DUAL LENS OPTICAL SYSTEM

CROSS-REFERENCE TO RELATED PATENT APPLICATIONS

This application is a continuation-in-part of application Ser. No. 11/974,874, filed on Oct. 16, 2007, which claims the benefit of Korean Patent Application No. 10-2006-0101030, filed on Oct. 17, 2006, in the Korean Intellectual Property Office, the disclosure of which is incorporated herein in its entirety by reference.

BACKGROUND

The present invention relates to an imaging device having a dual lens optical system.

Recently, digital cameras have gradually become smaller and thinner. To this end, many cameras are adopting a refraction optical system. Also, many digital cameras are adopting a zoom optical system to improve convenience. However, as digital cameras become smaller and thinner, the inner space of the digital camera decreases so that there is a limit in adjusting the focal length using the zoom optical system. Accordingly, there is a limit in increasing the optical zoom ratio. A digital zoom is employed to compensate for the limit using software. However, since digital zoom uses a part of an image for magnification, image quality is deteriorates. Thus, the optical zoom ratio can be increased by simultaneously adopting the zoom optical system having a focal length in a standard range and a single focus optical system having a shorter focal length.

There are two conventional methods to adopt both of the different optical systems. The first method is to include a single image sensor and a plurality of optical systems and selectively use the appropriate optical system. The second method is to include a plurality of image sensors and a plurality of optical systems.

Japanese Patent Publication No. 10-254055 discloses an optical system using the first method. Referring to FIG. 1A, light passing through a first optical system 1 is reflected by a first reflection mirror 4 and incident on an image sensor 7. Referring to FIG. 1B, as the first reflection mirror 4 is moved to a vertical orientation, light passing through a second optical system 2 is reflected by a second reflection mirror 5 and incident on the image sensor 7. Referring to FIG. 1C, as the first and second reflection mirrors 4 and 5 are moved to the vertical orientation, light passing through a third optical system 3 is reflected by a third reflection mirror 6 and incident on the image sensor 7. Since all the optical systems 1, 2, and 3 to be adopted need to be included inside a compact camera, it is difficult to reduce the number of parts and make the camera compact.

Likewise, in an optical system using the second method, since the number of parts is further increased compared to the first method, it is difficult to reduce the costs for materials and make a camera compact.

SUMMARY

To solve the above and/or other problems, an embodiment of the present invention provides an imaging device having a dual lens optical system.

According to an aspect of the present invention, there is provided an imaging device having a dual lens optical system comprising a first optical system reflecting an optical axis of light indicating an image of an object by 90° to form an image on an image sensor, and a second optical system having a movable reflection member configured to be selectively located on the part of a redirected axis of the optical axis of light passing through the first optical system, and refracting the light indicating the image of the object by 90° using the movable reflection member to be formed on the image sensor, wherein the first optical system and the second optical system share lenses and the image sensor located along an optical path after the movable reflection member.

The first and second optical systems share parts existing on the same optical path located after the movable reflection member. For example, the first and second optical systems share the second zoom lens group, the focusing lens group, and the image sensor. Thus, the number of parts is reduced compared to the conventional methods and there is less restriction in design space.

The first optical system comprises a first incident lens where light indicating the image of the object is incident, a first prism refracting the optical axis of the light by 90°, a first zoom lens group and a second zoom lens group adjusting a focal length to change a zoom ratio while moving along the optical axis, an image sensor where the light indicating the image of the object is formed, and a focusing lens group arranged to move along the optical axis between the second zoom lens group and the image sensor and adjusting focus so that the light indicating the image of the object is well formed on the image sensor.

The second optical system comprises a movable reflection member selectively positioned on the optical axis of light between the first zoom lens group and the second zoom lens group to allow light incident from an optical axis perpendicular to the part of the redirected optical axis of the first optical system to be formed on the image sensor, a second incident lens where the light indicating the image of the object is incident toward the movable reflection member in a direction perpendicular to the redirected optical axis of the first optical system, the second zoom lens group, and the image sensor.

The first optical system may be a zoom optical system and the second optical system may be a single-focus optical system having a focal length shorter than the focal length of the first optical system. Thus, the dual lens optical system according to an embodiment of the present invention integrally adopts the zoom optical system and the single-focus optical system. Thus, a wider range of an optical zoom ratio can be obtained compared to when the zoom optical system is only used.

The movable reflection member may be a prism or a reflection mirror. Also, the dual lens optical system may further comprise a lens cover selectively blocking the light on the second incident lens.

The lens cover blocks the second incident lens when the movable reflection member is not located on the optical axis between the first zoom lens group and the second zoom lens group and opens the second incident lens when the movable reflection member is located on the optical axis between the first zoom lens group and the second zoom lens group.

According to another aspect of the present invention, there is provided an imaging device having the dual lens optical system, a control unit receiving an electric signal from the image sensor and performing operation, and a memory unit electrically connected to the control unit and storing data indicating the image of the object.

According to another aspect of the present invention, there is provided an imaging device having a dual lens optical system, the device comprising an image sensor; a first optical system having a first incident lens oriented with respect to a first side of the imaging device; a second optical system having a second incident lens oriented with respect to a second side of the image device; and a reflection member movable between a first position and a second position, wherein, when the reflection member is in the first position, a light image received via the first incident lens is redirected to a first optical axis such that the light image is focused on an imaging area of the image sensor, wherein, when the reflection member is in the second position, a light image received via the second incident lens is redirected to the first optical axis such that the light image is focused on the same imaging area of the image sensor, and wherein at least one optical element is disposed between the image sensor and the reflection member.

In this embodiment, the first optical system and the second optical system share only one common optical axis. Therefore, the overall optical system of the embodiment is more simple than an optical system having a dual lens which shares more than one common optical axis.

In this embodiment, the first optical system and the second optical system include separate focusing mechanisms. Each focusing mechanism is independently capable of selectively focusing light images received via a respective incident lens on the image sensor.

According to yet another aspect of the present invention, there is a provided an imaging device having a dual lens optical system, the device comprising a first optical system and a second optical system for selectively directing one of two light images received via two incident lenses to a first optical axis toward an image sensor by at least one reflection member, wherein at least one optical element is disposed between an image sensor and the reflection member, and wherein the two incident lenses are arranged to face different directions.

In this embodiment, the first optical system and the second optical system share only one common optical axis.

In this embodiment, said at least one optical element comprises at least one zoom lens group to adjust a focal length to change a zoom ratio while moving along the first optical axis.

In this embodiment, said at least one optical element comprises a focusing lens group arranged to move along the first optical axis so as to adjust focus of an image on the image sensor.

In this embodiment, the two incident lenses are disposed at a corresponding location and facing opposite directions, and said at least one reflection member is a reflection member rotatable to selectively redirect two light images from the incident lenses into a first optical axis of light. Therefore, a user can photograph either an object facing the first incident lens or an object facing the second incident lens in opposite orientation to the first incident lens.

In this embodiment, the two incident lenses are not disposed at a corresponding location and facing opposite directions, and said at least one reflection member comprises a first and second reflection members, the first reflection member disposed at a corresponding location to a first incident lens and the second reflection member disposed at a corresponding location to a second incident lens.

In this embodiment, the first reflection member is a prism or a mirror, and the second reflection member is a reflection member movable to selectively reflect the light from the second incident lens while blocking the light from the first incident lens.

In this embodiment, the two incident lenses are provided on opposite sides of the image device. Therefore, when this embodiment is incorporated in a mobile camera phone, the user can photograph an object in front of the user in a usual mode, and also the user can photograph himself or herself in a videotelephony mode with the same phone.

In this embodiment, the two incident lenses are disposed along a same axis or alternatively, the two incident lenses can be disposed along different axes.

According to yet another aspect of the present invention, there is provided an imaging device having a dual lens system, the device comprising a first optical system and a second optical system adapted to respectively direct each of light images received via two incident lenses to a first optical axis toward an image sensor, one of the first optical system and the second optical system including a zoom optical system having a first zoom lens group and a second zoom lens group; a first reflection member for directing light image from the first incident lens; and a second reflection member for directing light image from the second incident lens, the second reflection member being selectively positioned in the first optical axis between the first zoom lens group and the second zoom lens group; wherein the two incident lenses are arranged to face different directions.

In this embodiment, the first optical system comprises the first incident lens on which the light is incident in a direction perpendicular to the first optical axis of light; the first reflection member redirecting an optical axis of the light incident from the first incident lens by 90°; and the first zoom lens group and the second zoom lens group adjusting a focal length to change a zoom ratio while moving along the first optical axis to allow the light incident from the first incident lens to be formed on the image sensor; the image sensor; and the second optical system comprises: the second incident lens on which the light is incident in a direction perpendicular to the first optical axis; the movable reflection member selectively positioned in the first optical axis of light between the first zoom lens group and the second zoom lens group to allow the light incident from the second incident lens to be formed on the image sensor; and the second zoom lens group disposed between the movable reflection member and the image sensor.

In this embodiment, at least one lens of the second zoom lens group comprises a focusing lens adjusting focus so that the light is well formed on the image sensor.

In this embodiment, the first optical system and the second optical system share a focusing lens group arranged to move along the first optical axis between the second zoom lens group and the image sensor so as to adjust focus an image on the image sensor.

According to yet another aspect of the present invention, there is provided an imaging device comprising two incident lenses; and at least one movable reflection member for selectively directing one of two light images received via a first optical system or a second optical system toward an image sensor; wherein at least one lens is disposed between the image sensor and the movable reflection member, and wherein the two incident lenses are arranged to face different directions.

In this embodiment, the first optical system comprises a first incident lens on which the light is incident in a direction perpendicular to the first optical axis of light; a first reflection member for redirecting an optical axis of the light incident from the first incident lens by 90°; and a first zoom lens group and the second zoom lens group for adjusting a focal length to change a zoom ratio while moving along the first optical axis to allow the light incident from the first incident lens to be formed on the image sensor; the image sensor, and the second optical system comprises a second incident lens on which the light is incident in a direction perpendicular to the first optical axis; a movable reflection member selectively positioned in the first optical axis of light between the first zoom lens group and the second zoom lens group to allow the light incident from the second incident lens to be formed on the image sensor; and a second zoom lens group disposed between the movable reflection member and the image sensor.

In this embodiment, at least one lens of the second zoom lens group is a focusing lens adjusting focus so that the light image is well formed on the image sensor.

In this embodiment, the first optical system and the second optical system share a focusing lens group arranged to move along the first optical axis between the second zoom lens group and the image sensor so as to adjust focus an image on the image sensor.

In this embodiment, said at least one lens is arranged with at least one of zoom or focus function.

According to yet another aspect of the present invention, there is provided an imaging device comprising an image sensor; two incident lenses; a first optical system having a non-movable reflection member for redirecting a light image towards the image sensor; and a second optical system having a movable reflection member for selectively redirecting a light image from the second optical system towards the image sensor; wherein the movable reflection member is disposed between the non-movable reflection member and the image sensor, wherein at least one optical element is disposed between the image sensor and the movable reflection member, and wherein the two incident lenses are facing the different directions.

In this embodiment, the first optical system comprises a first incident lens on which the light is incident in a direction perpendicular to a first optical axis of light; the non-movable first reflection member for redirecting an optical axis of the light incident from the first incident lens by 90°; and a first zoom lens group and a second zoom lens group for adjusting a focal length to change a zoom ratio while moving along the first optical axis to allow the light incident from the first incident lens to be formed on the image sensor; and the second optical system comprises a second incident lens on which the light is incident in a direction perpendicular to the first optical axis; the movable reflection member selectively positioned in the first optical axis of light between the first zoom lens group and the second zoom lens group to allow the light incident from the second incident lens to be formed on the image sensor; and the second zoom lens group disposed between the movable member and the image sensor.

In this embodiment, at least one lens of the second zoom lens group is a focusing lens for adjusting a focus so that the light image is well formed on the image sensor.

In this embodiment, the first optical system and the second optical system share a focusing lens group arranged to move along the first optical axis between the second zoom lens group and the image sensor so as to adjust focus of an image on the image sensor.

In this embodiment, said at least one lens is to be with at least one of zoom or focus function.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE EMBODIMENTS

Figure 1A:
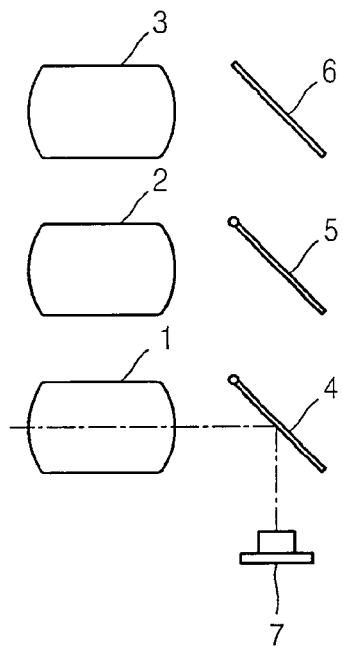
FIGS. 1A through 1C illustrate the operations of an optical system of a conventional multi-focus camera.
Figure 1B:
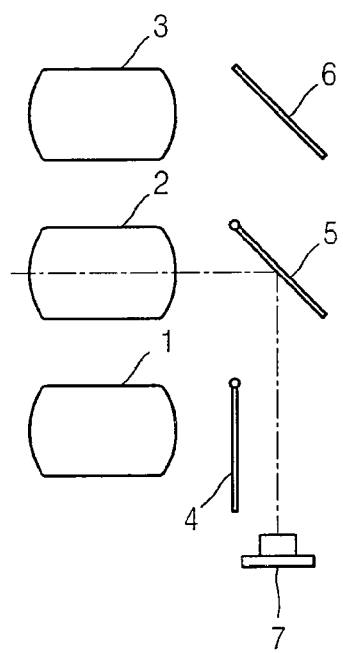
Figure 1C:
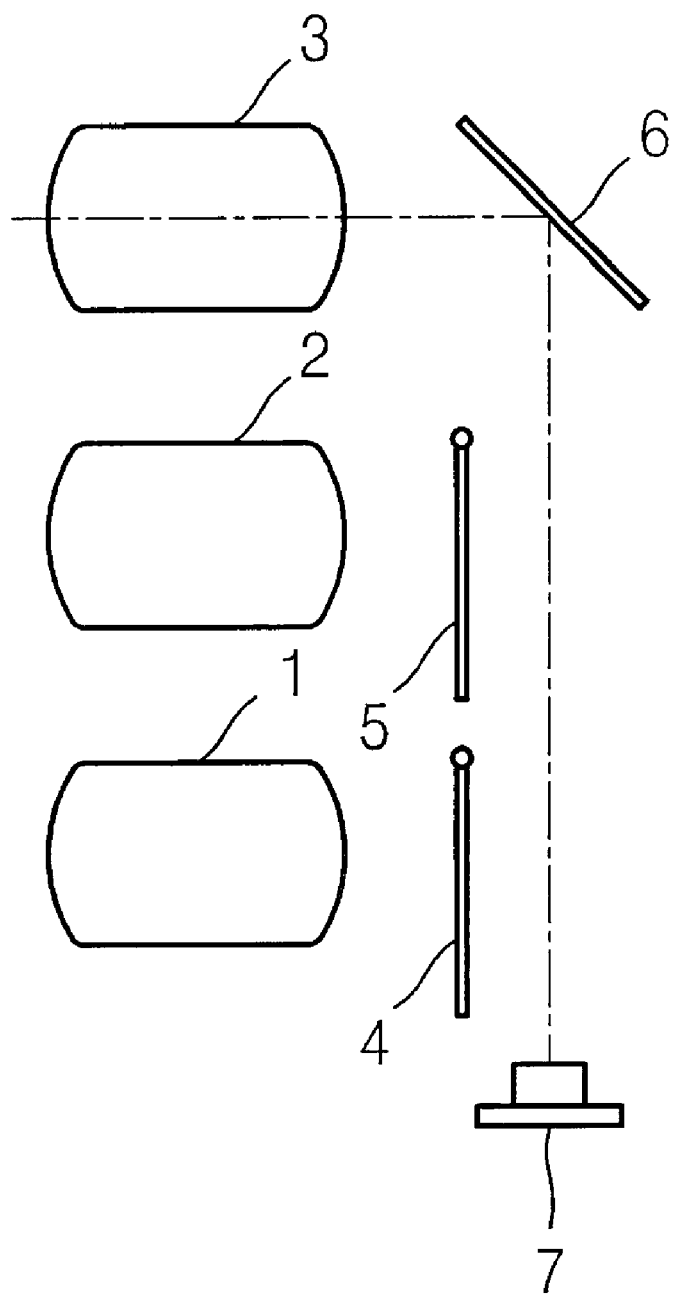

Hereinafter, the present invention will be described in detail by explaining preferred embodiments of the invention with reference to the attached drawings. Like reference numerals in the drawings denote like elements.

Figure 2A:
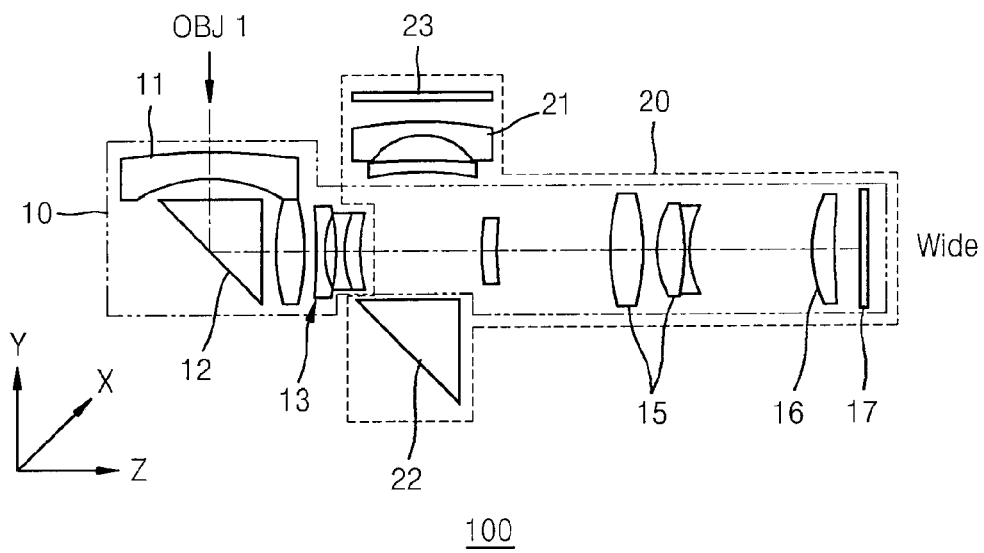
FIG. 2A illustrates a dual lens optical system in a Wide mode according to an embodiment of the present invention.
Figure 2B:
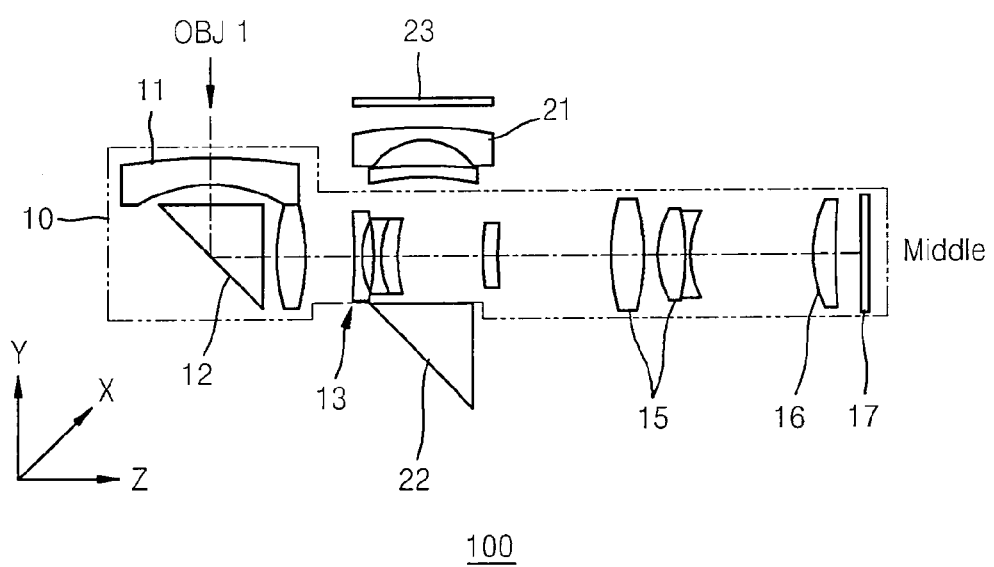
FIG. 2B illustrates a dual lens optical system in an Middle mode according to an embodiment of the present invention.
Figure 2C:
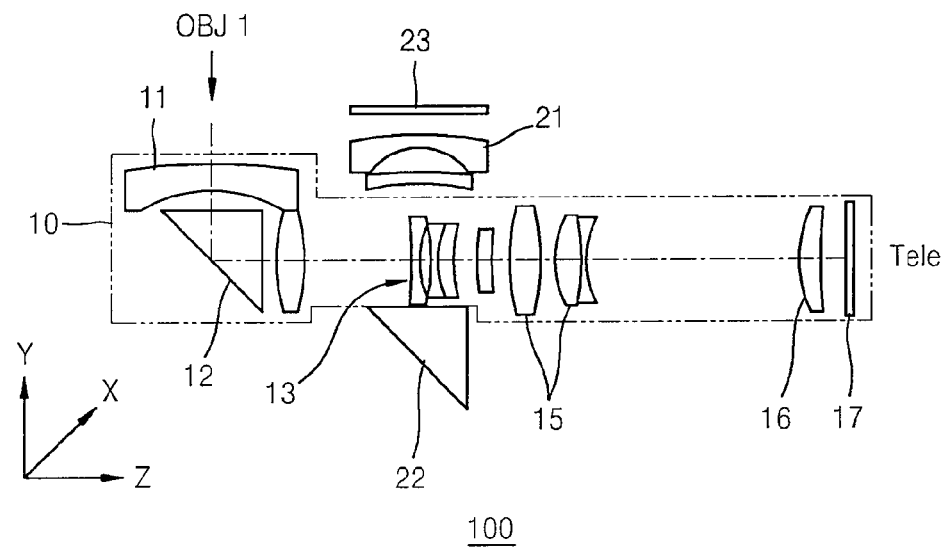
FIG. 2C illustrates a dual lens optical system in a Tele mode according to an embodiment of the present invention.

FIGS. 2A, 2B, and 2C respectively illustrate a dual lens optical system in a wide angle mode ("Wide"), a medium angle mode ("Middle"), and a telephoto mode ("Tele") according to an embodiment of the present invention. Referring to FIGS. 2A, 2B, and 2C, the dual lens optical system according to the present embodiment includes a first optical system 10 and a second optical system 20. In the current embodiment, the first optical system 10 is related to a zoom optical system while the second optical system 20 is related to a wide angle single-focus optical system.

The first optical system 10 includes a first incident lens 11, a first prism 12, a first zoom lens group 13, a second zoom lens group 15, a focusing lens group 16, and an image sensor 17. The first prism 12 redirects the optical axis of a path along which light proceeds, by 90°, the light representing an image of an object OBJ 1. The first zoom lens group 13 and the second zoom lens group 15 move along the optical axis to adjust a focus length and determine a zoom ratio. The focusing lens group 16 moves along the optical axis to adjust the focus so that the light representing the image of the object OBJ 1 can be well formed on the image sensor 17. Although in the drawings the focusing lens group 16 is a single lens, it may also include two or more lenses. The image sensor 17 receives the light representing the image of the object OBJ 1 and converts the light to an electric signal for each pixel thereof. The image sensor 17 can be a charge coupled device (CCD) or a complementary metal oxide semiconductor (CMOS), or any other suitable image sensing device.

The first optical system 10 is a zoom optical system that changes between Wide, Middle and Tele modes according to the movements of the first and second zoom lens groups 13 and 15. In detail, the focal length is the distance between the lens and the film (or image sensor) when the focus is on an image located at an infinite distance. In terms of a 35 mm camera, a standard focal length is between 40-100 mm. In the Wide mode, the focal length is relatively short, for example, 39 mm, so that a viewing angle is wide and a range of vision is large. Since the focal length is shorter than the standard, the Wide mode is a wide angle mode. Conversely, in the Tele mode, the focal length is relatively long, for example, 144.3 mm, so that the viewing angle is narrow and the range of vision is small. Since the focal length is longer than the standard, the Tele mode is telephoto mode. In the Tele mode, the optical zoom ratio is 3× because the focal length is three times longer than the focal length in the Wide mode.

In the above zoom optical system, the optical zoom ratio is determined by the movements of the first and second zoom lens groups 13 and 15 in a Z-axis direction. As digital cameras become smaller and thinner, there is a limit in increasing the optical zoom ratio. Thus, the dual lens optical system according to the present embodiment additionally adopts the second optical system 20.

Figure 2D:
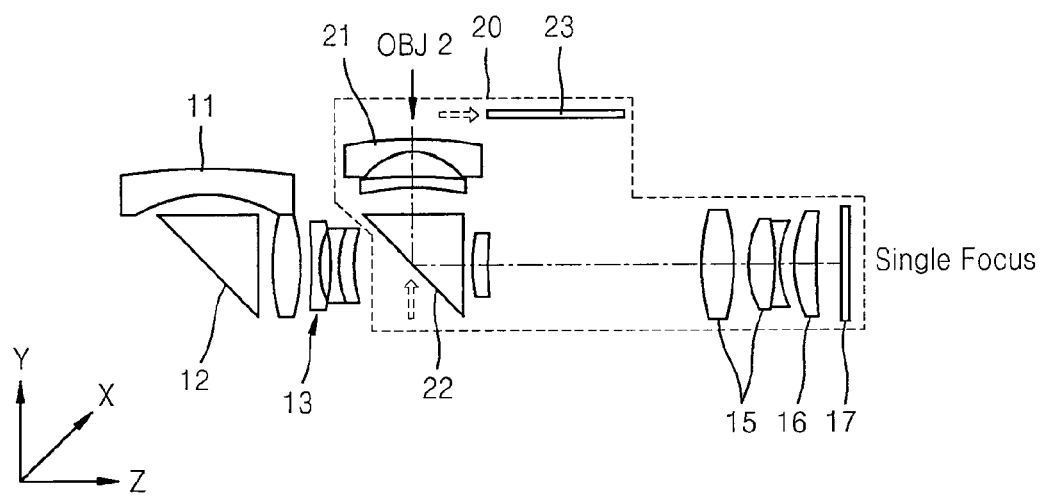
FIG. 2D illustrates a dual lens optical system in a SINGLE-FOCUS mode according to an embodiment of the present invention.

FIG. 2D illustrates an imaging device having a dual lens optical system in a SINGLE-FOCUS mode according to an embodiment of the present invention. Referring to FIG. 2D, the second optical system 20 is a wide angle single-focus optical system. The second optical system 20 includes a lens cover 23, a second incident lens 21, a second prism 22, a first zoom lens group 13, a second zoom lens group 15, a focusing lens group 16, and an image sensor 17. The lens cover 23 may manually or automatically block light incident on the second incident lens 21. Although in the drawing the lens cover 23 is a single plate and moves to another position, a method of closing or opening the second incident lens 21 by the lens cover 23 can be easily modified by those skilled in the art. That is, the lens cover 23 is made of a plurality of pieces like a camera shutter and, as the pieces rotate around a predetermined axis, the second incident lens 21 can be closed or open.

Figure 10:
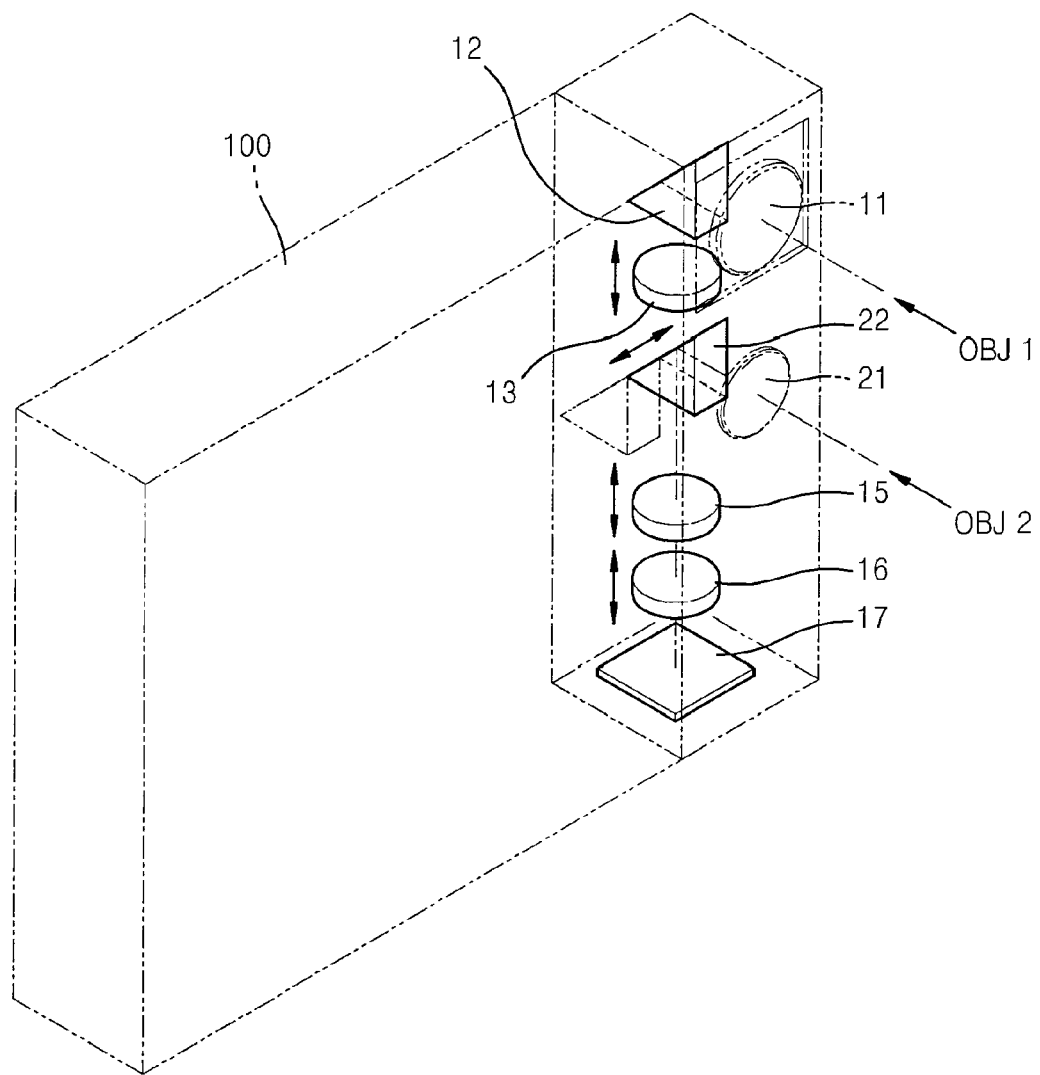
FIG. 10 schematically illustrates a dual lens camera according to embodiments of the present invention.

When a user tries to use the second optical system 20, the lens cover 23 is opened to allow light to pass through the second incident lens 21 and the second prism 22 which is positioned on an axis between the first zoom lens group 13 and the second zoom lens group 15. The driving direction of the second prism 22 can be a Y-axis direction as shown in FIG. 2D or an X-axis direction as shown in FIG. 10. The driving of a prism can be performed by a motorized mechanism such as a piezoelectric motor or a voice coil motor. The present invention is not limited thereto and many other motorized mechanisms capable of performing a linear motion can be used therefor.

When the second prism 22 is arranged along the optical axis which is between the first and second zoom lenses 13 and 15, the second prism 22 redirects the light representing the image of the object OBJ 2 passing through the second incident lens 21 by 90° to proceed toward the image sensor 17 and simultaneously block the light passing through the first incident lens 11.

In the present invention, as an embodiment of a single-focus optical system, a wide angle single-focus optical system having a focal length shorter than that of the zoom optical system in the Wide mode is illustrated. The focal length of the single-focus optical system can be 24 mm. Thus, since the viewing angle is wider, a larger number of objects can be photographed in the same photo. That is, the dual lens optical system according to the present embodiment integrally adopts the first optical system 10 (the zoom optical system) and the second optical system 20 (the single-focus optical system). Thus, an optical zoom ratio in a range is higher than that when only the zoom optical system is used.

In particular, the first and second optical systems 10 and 20 may share at least some elements on the same optical path disposed after the second prism 22 that is a movable reflection member. For example, the first and second optical systems 10 and 20 share the second zoom lens group 15, the focusing lens group 16, and the image sensor 17. Thus, the number of elements is reduced compared to conventional methods and therefore there is more efficient use of design space. That is, compared to conventional methods, the present invention provides a high optical zoom ratio in a smaller and thinner digital camera. Also, the cost for materials can be reduced.

FIGS. 3A through 3D illustrate a dual lens optical system according to another embodiment of the present invention. FIGS. 4A through 4D illustrate a dual lens optical system according to yet another embodiment of the present invention. The difference in the embodiments of FIGS. 3 and 4 from FIGS. 2A through 2D is that the movable reflection member is a reflection mirror 122 not the second prism 22. In addition, in FIGS. 4A through 4D, the reflection mirror 222 is in a different position, obviating the need for a separate lens cover 23.

The dual lens optical systems shown in FIGS. 3A through 3D and FIGS. 4A through 4D adopt reflection mirrors 122 and 222, respectively, instead of the second prism 22 illustrated in FIGS. 2A through 2D. When the dual lens optical systems shown in FIGS. 3A through 3C and FIGS. 4A through 4C are used as zoom optical systems, the reflection mirrors 122 and 222 are not located on the optical axis between the first and second zoom lens groups 13 and 15.

In FIGS. 3A through 3D, the lens cover 23 blocks the second incident lens 21 to prevent the light indicating the image of the object OBJ 2 from being incident on the second incident lens 21. Thus, the light representing the image of the object OBJ 1 passes through the first incident lens 11 and is redirected by the first prism 12 by 90° and passes through the first zoom lens group 13, the second zoom lens group 15, and the focusing lens group 16 for the image to be formed on the image sensor 17.

When the second optical system 120 (the single-focus optical system) is used, the lens cover 23 opens the second incident lens 21 and the reflection mirror 122 pivots to be located on an axis between the first and second zoom lens groups 13 and 15. It is important that the reflection mirrors 122 is accurately positioned at 45° with respect to the axis between the first and second zoom lens groups 13 and 15 to allow the incident light to accurately proceed toward the image sensor 17.

In the dual lens optical systems shown in FIGS. 4A through 4D, the reflection mirror 222 is arranged close to the second incident lens 21 and the lens cover 23 is not provided, unlike the dual lens optical system shown in FIGS. 3A through 3D. When the first optical system 10 (the zoom optical system) is used, the reflection mirror 222 is arranged parallel to the optical axis between the first zoom lens group 13 and the second zoom lens group 15. Accordingly, since the reflection mirror 222 blocks the light representing the image of the object OBJ 2 passing through the second incident lens 21, the lens cover 23 is not needed.

When the second optical system 220 (the single-focus optical system) is used, the reflection mirror 222 pivots by 45° to be located on an axis between the first zoom lens group 13 and the second zoom lens group 15. Thus, the light representing the image of the object OBJ 1 incident on the first incident lens 11 is blocked by the reflection mirror 222. Only the light representing the image of the object OBJ 2 incident on the second incident lens 21 is redirected by 90° by the reflection mirror 222 and proceeds toward the image sensor 17. It is important that the reflection mirror 222 is accurately positioned at 45° with respect to the axis between the first zoom lens group 13 and the second zoom lens group 15 to allow the incident light to accurately proceed toward the image sensor 17.

Figure 3A:
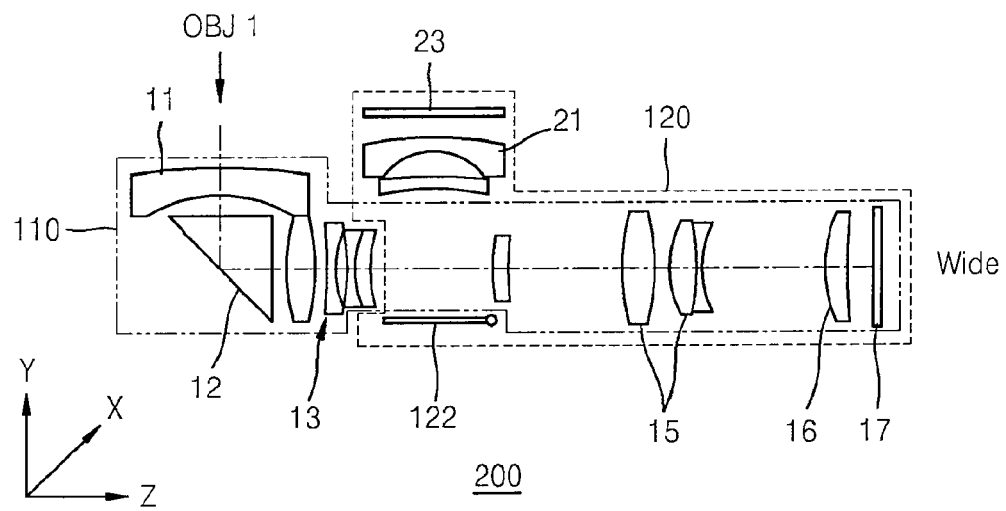
FIG. 3A illustrates a dual lens optical system in a Wide mode according to another embodiment of the present invention.
Figure 3B:
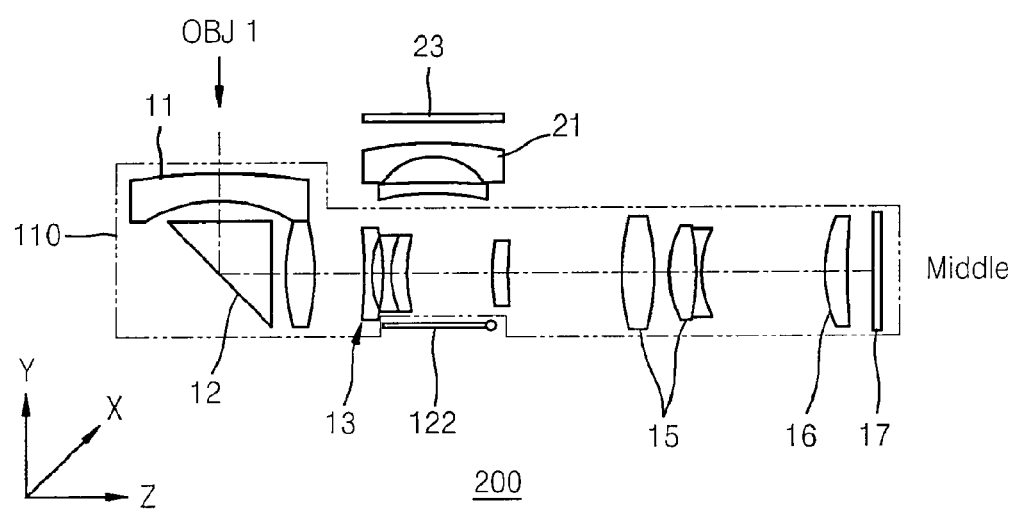
FIG. 3B illustrates a dual lens optical system in an Middle mode according to another embodiment of the present invention.
Figure 3C:
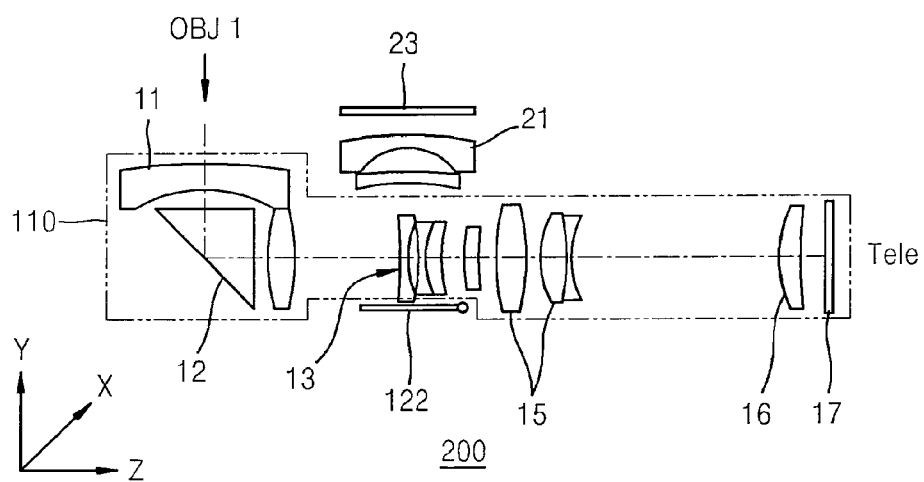
FIG. 3C illustrates a dual lens optical system in a Tele mode according to another embodiment of the present invention.
Figure 3D:
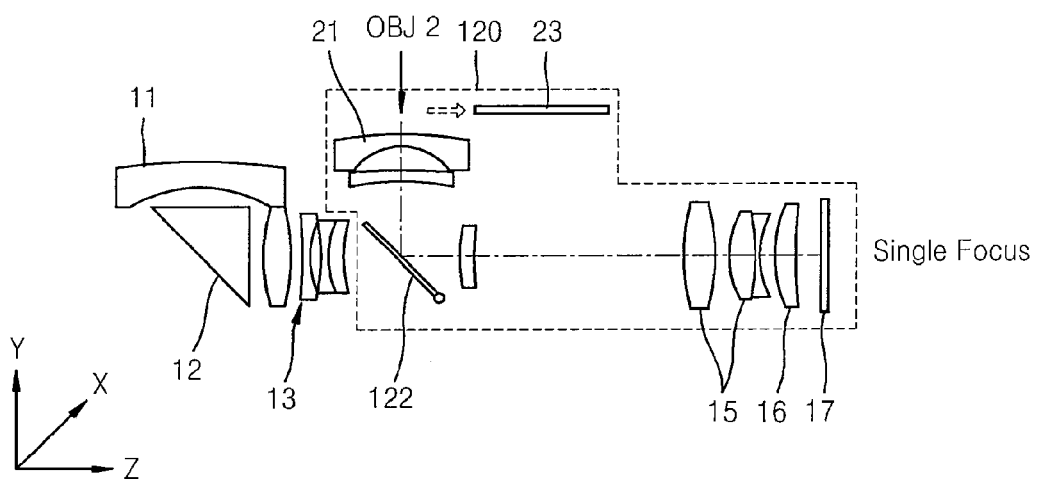
FIG. 3D illustrates a dual lens optical system in a SINGLE-FOCUS mode according to another embodiment of the present invention.
Figure 4A:
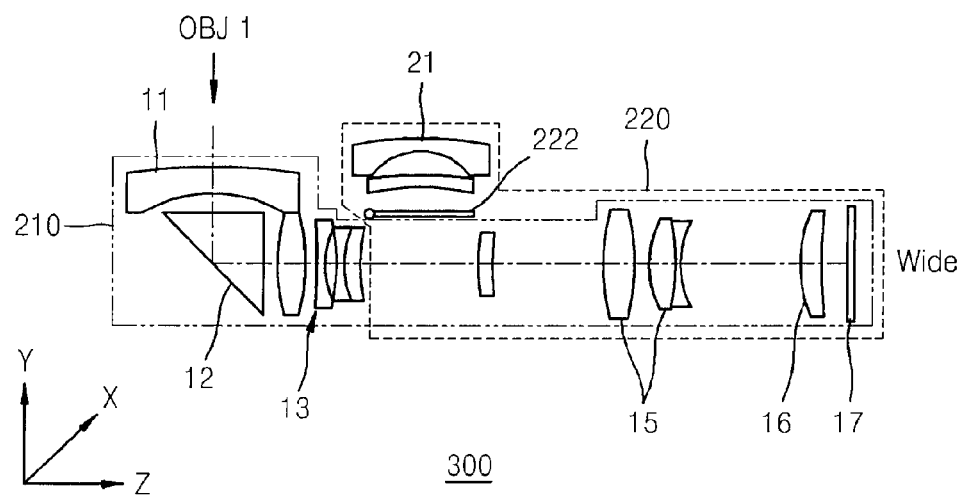
FIG. 4A illustrates a dual lens optical system in a Wide mode according to yet another embodiment of the present invention.
Figure 4B:
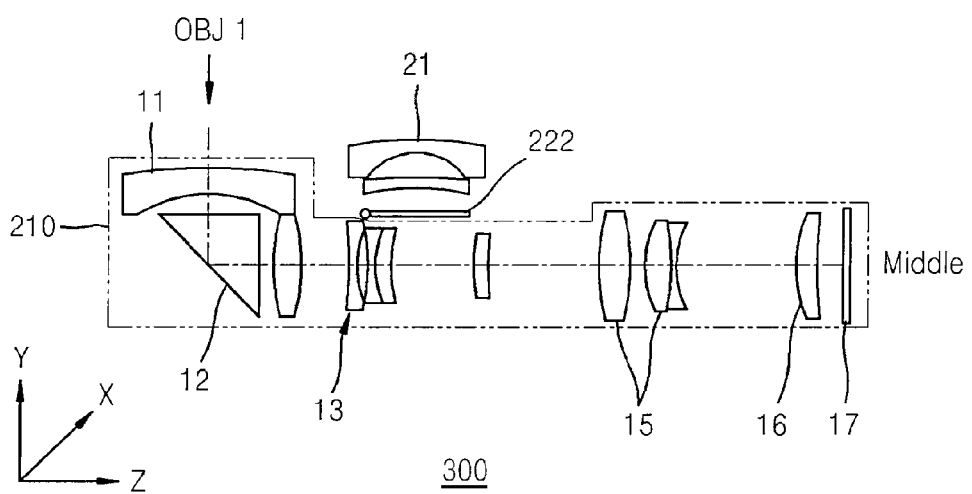
FIG. 4B illustrates a dual lens optical system in an Middle mode according to yet another embodiment of the present invention.
Figure 4C:
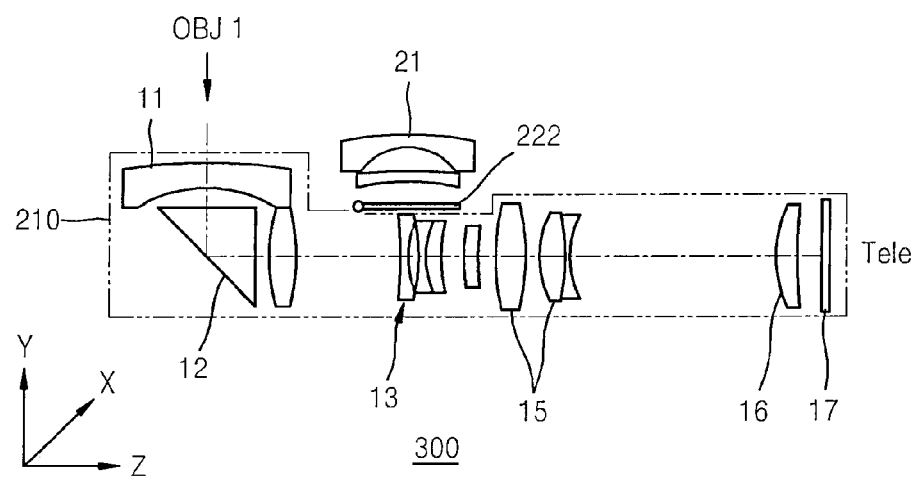
FIG. 4C illustrates a dual lens optical system in a Tele mode according to yet another embodiment of the present invention.
Figure 4D:
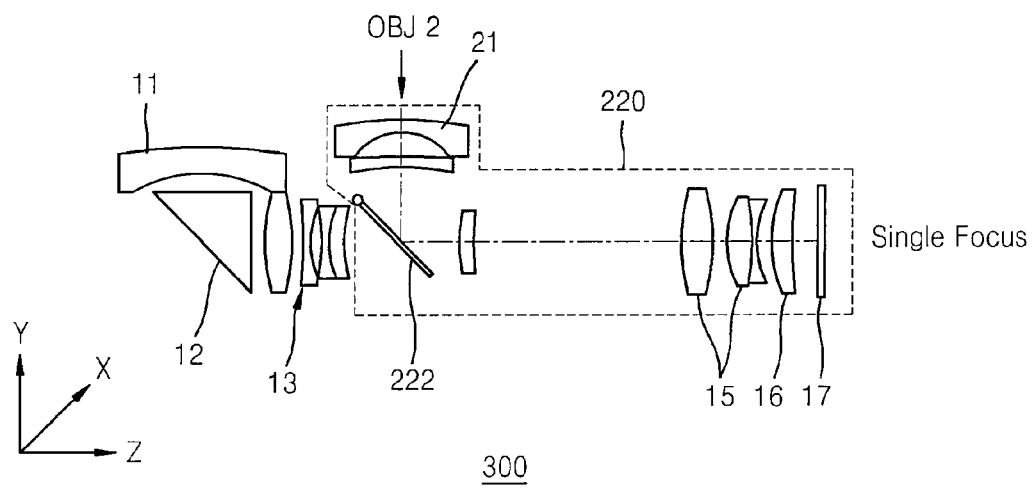
FIG. 4D illustrates a dual lens optical system in a SINGLE-FOCUS mode according to yet another embodiment of the present invention.
Figure 5A:
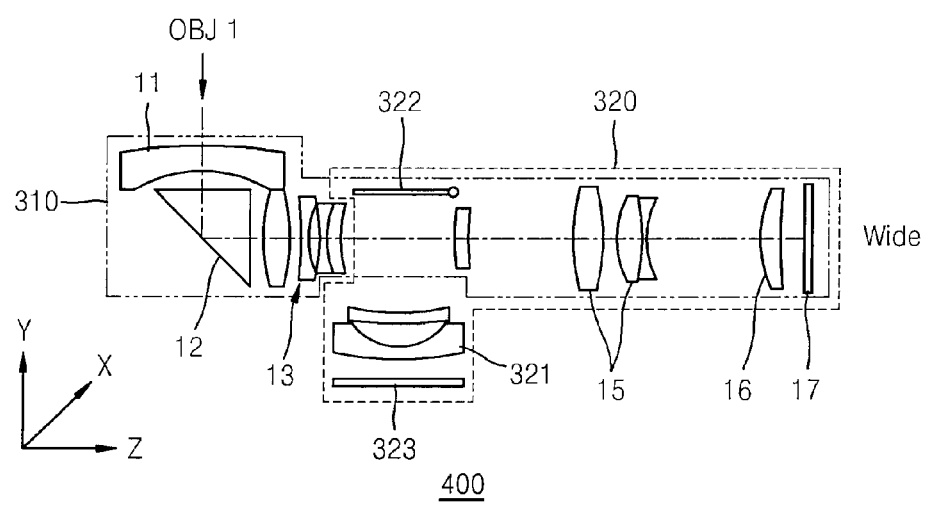
FIG. 5A illustrates a dual lens optical system in a Wide mode according to yet another embodiment of the present invention.
Figure 5B:
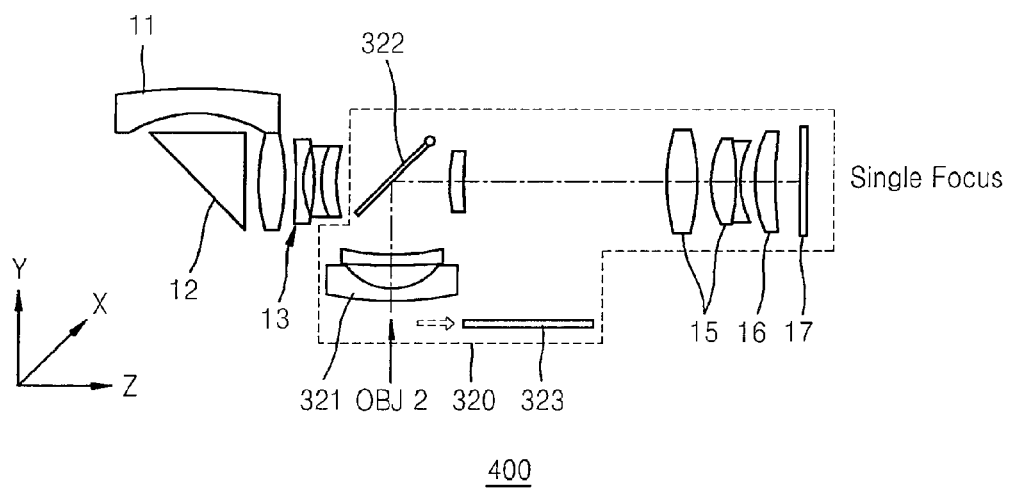
FIG. 5B illustrates a dual lens optical system in a SINGLE-FOCUS mode according to yet another embodiment of the present invention.

FIGS. 5A and 5B respectively illustrate a dual lens optical system in a wide angle mode, and in a super wide single-focus mode according to yet another embodiment of the present invention. The difference in the embodiments of FIGS. 5A and 5D from FIGS. 3A and 3D is that light representing the image of the object OBJ 2 incident on the second incident lens 321 enters from the opposite side to light representing the image of the object OBJ 1. In other words, the first optical system is for photographing the object OBJ 1 in one direction while the second optical system is for photographing the object OBJ 2 in the other direction which is opposite to said one direction. Accordingly, the second incident lens 321, the lens cover 323 and the reflection mirror 322 in this embodiment are disposed opposite to those in the embodiment illustrated in FIGS. 3A and 3D.

The first optical system 310 may be a zoom optical system that changes between Wide, Middle and Tele modes according to the movements of the first and second zoom lens groups 13 and 15. Therefore, the first optical system 310 can be used to photograph the object OBJ 1 which lies further ahead because of its zooming function and narrower viewing angle than the second optical system 320. On the other hand, the second optical system 320 may be super wide angle single-focus optical system. Therefore, the second optical system 320 can be used to photograph such object OBJ 2 as a user's face which lies closer because of its wider viewing angle.

Figure 6A:
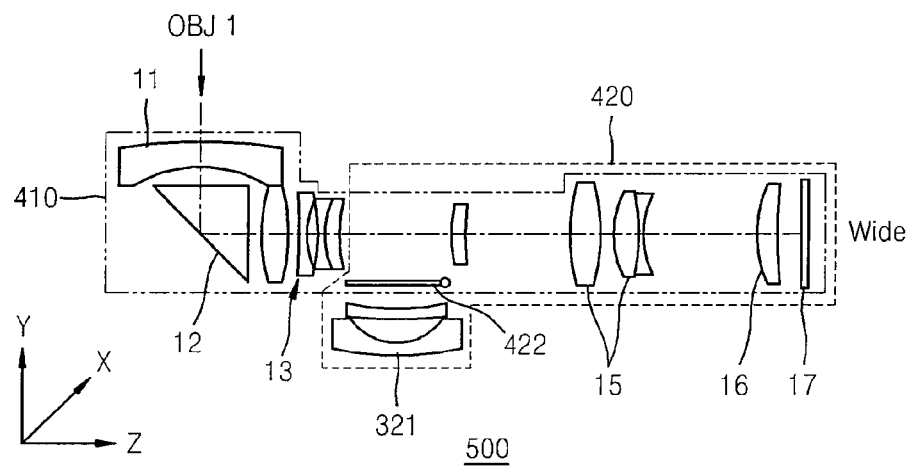
FIG. 6A illustrates a dual lens optical system in a Wide mode according to yet another embodiment of the present invention.
Figure 6B:
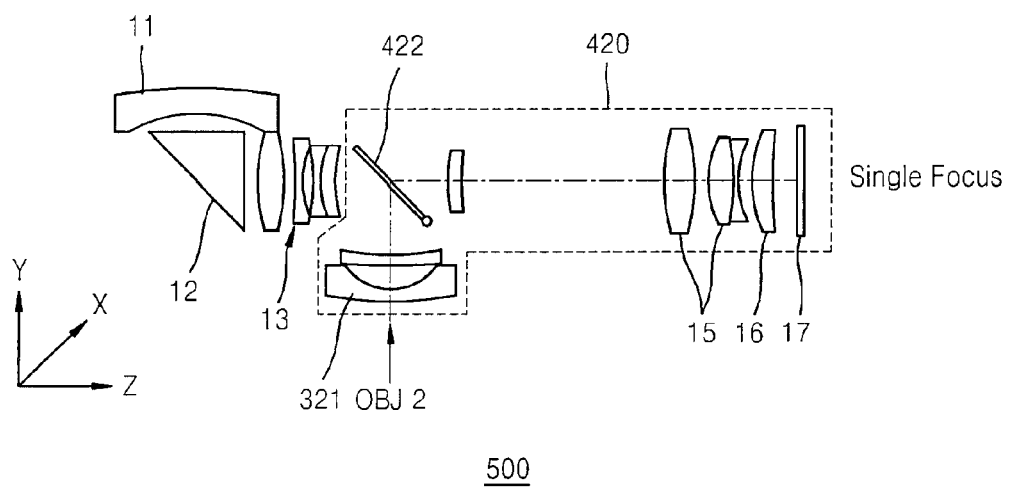
FIG. 6B illustrates a dual lens optical system in a SINGLE-FOCUS mode according to yet another embodiment of the present invention.

FIGS. 6A and 6B respectively illustrate a dual lens optical system in a wide angle mode, and in a super wide single-focus mode according to yet another embodiment of the present invention. The embodiments of FIGS. 6A and 6B are different from FIGS. 5A and 5B in that the reflection mirror 422 is arranged close to the second incident lens 321 and the lens cover is not provided.

When the first optical system 410, which may be a zoom optical system, is used, the reflection mirror 422 is arranged parallel to the optical axis between the first zoom lens group 13 and the second zoom lens group 15. Accordingly, since the reflection mirror 422 blocks the light representing the image of the object OBJ 2 passing through the second incident lens 321, the lens cover is not needed.

When the second optical system 420, which may be a super wide single-focus optical system, is used, the reflection mirror 422 pivots by 45° to be located on an axis between the first zoom lens group 13 and the second zoom lens group 15. Thus, the light representing the image of the object OBJ 1 incident on the first incident lens 11 is blocked by the reflection mirror 422. Only the light representing the image of the object OBJ 2 incident on the second incident lens 321 is redirected by 90° by the reflection mirror 422 and proceeds toward the image sensor 17. It is important that the reflection mirror 222 is accurately positioned at 45° with respect to the axis between the first zoom lens group 13 and the second zoom lens group 15 to allow the incident light to accurately proceed toward the image sensor 17.

Figure 7A:
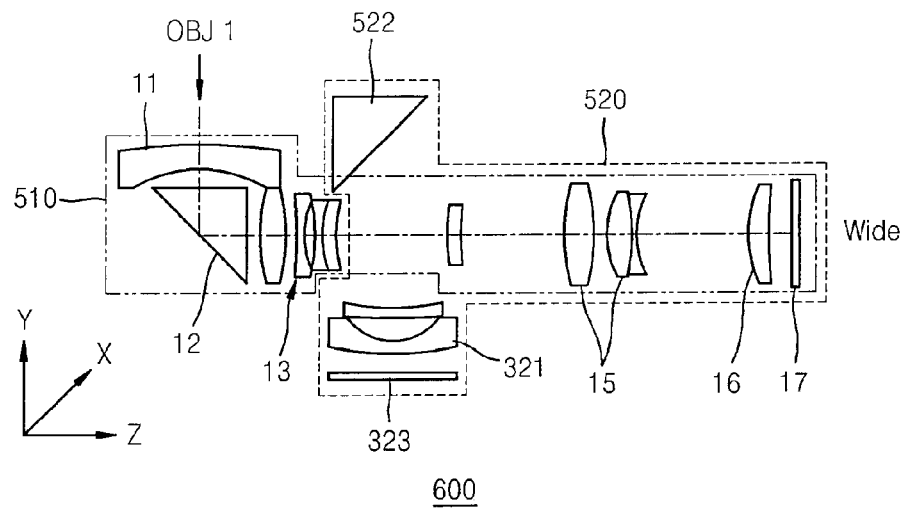
FIG. 7A illustrates a dual lens optical system in a Wide mode according to yet another embodiment of the present invention.
Figure 7B:
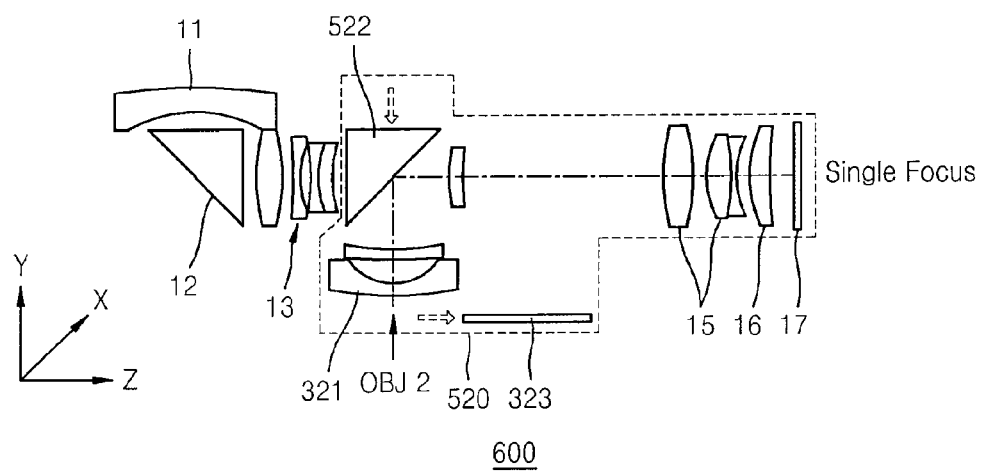
FIG. 7B illustrates a dual lens optical system in a SINGLE-FOCUS mode according to yet another embodiment of the present invention.

FIGS. 7A and 7B respectively illustrate a dual lens optical system in a wide angle mode, and in a super wide single-focus mode according to yet another embodiment of the present invention. The embodiments of FIGS. 7A and 7B is different from FIGS. 5A and 5B in that the movable reflection member is the second prism 522, not the reflection member. Since this embodiment is the same as the embodiment illustrated in FIGS. 5A and 5B except the above mentioned difference, further description of this embodiment will be omitted.

Figure 8A:
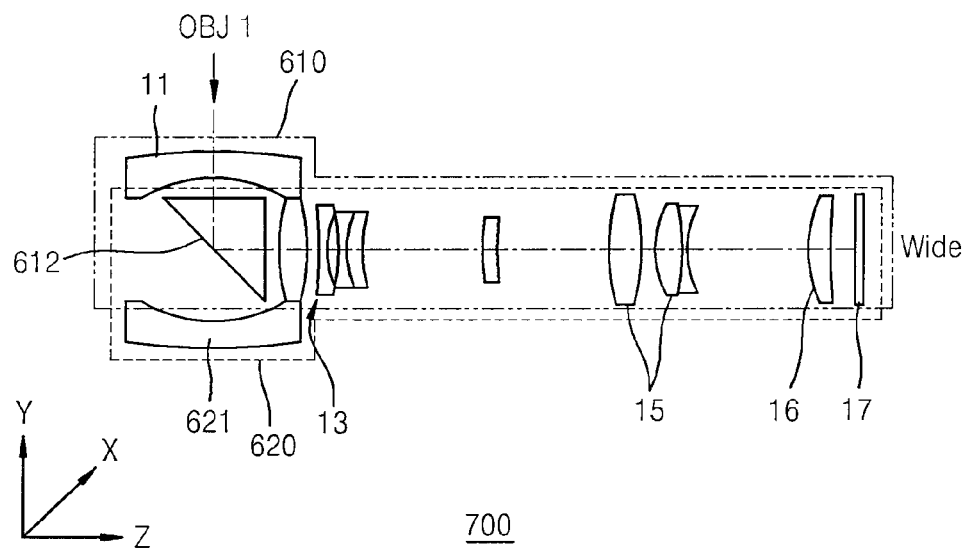
FIG. 8A illustrates a dual lens optical system in a Wide mode according to yet another embodiment of the present invention.
Figure 8B:
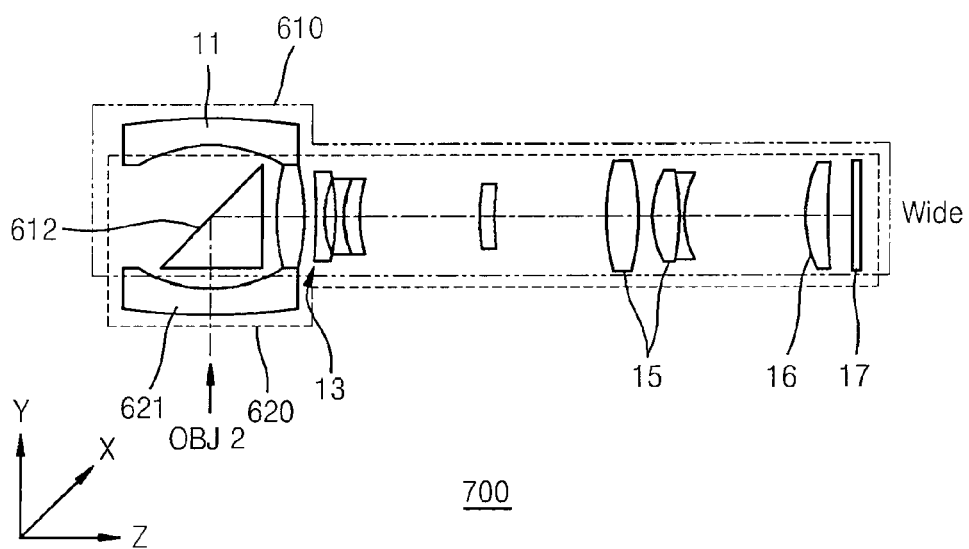
FIG. 8B illustrates a dual lens optical system in a SINGLE-FOCUS mode according to yet another embodiment of the present invention.

FIGS. 8A and 8B respectively illustrate a dual lens optical system in a wide angle mode, and in a super wide single-focus mode according to yet another embodiment of the present invention.

In this embodiment, the second optical system receives light representing the image of the object OBJ 2 from the right opposite to light representing the image of the object OBJ 1. That is, light representing the image of the object OBJ 2 lies at the same optical axis as light representing the image of the object OBJ 1, but two lights representing the images of the objects OBJ 1 and OBJ 2 face opposite directions. Since the two lights from opposite directions through the first incident lens 11 and the second lens 621 respectively are coincident, the first and second optical systems can share the common reflection member 612. Also, the first and second optical systems share all of the optical elements except the incident lenses 11 and 621. Therefore, the imaging device having this embodiment of the dual lens optical system can be made smaller and thinner. Also, the cost for materials can be reduced.

In this embodiment, the reflection member 612 is a prism. The prism 612 is arranged to rotate about a center between the first incident lens 11 and the second incident lens 621. When the reflection surface of the prism 612 is toward the first incident lens 11, the first optical system 610 is used to photograph the object OBJ 1 because light representing the image of the object OBJ 2 is blocked by the prism 612. On the other hand, when the reflection surface of the prism 612 is toward the second incident lens 621, the second optical system 620 is used to photograph the object OBJ 2.

Figure 9A:
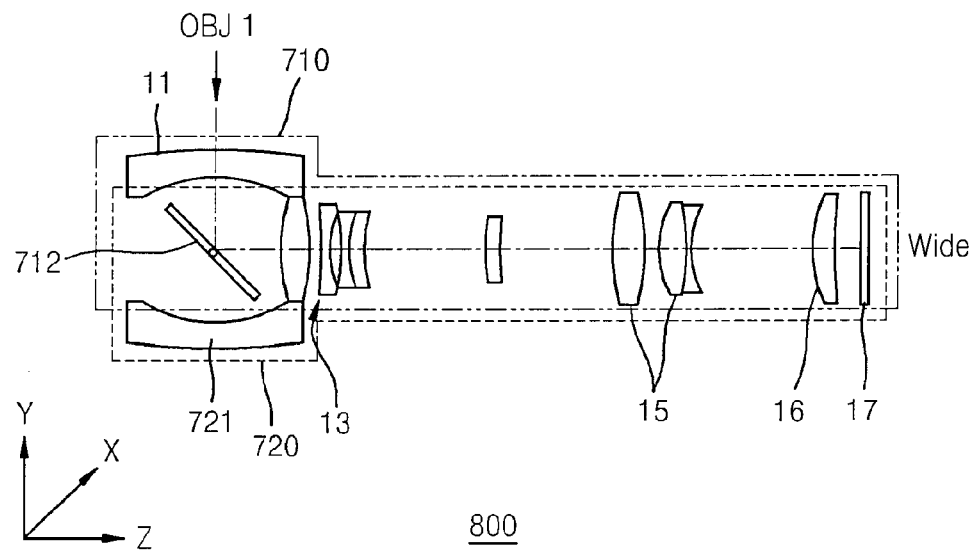
FIG. 9A illustrates a dual lens optical system in a Wide mode according to yet another embodiment of the present invention.
Figure 9B:
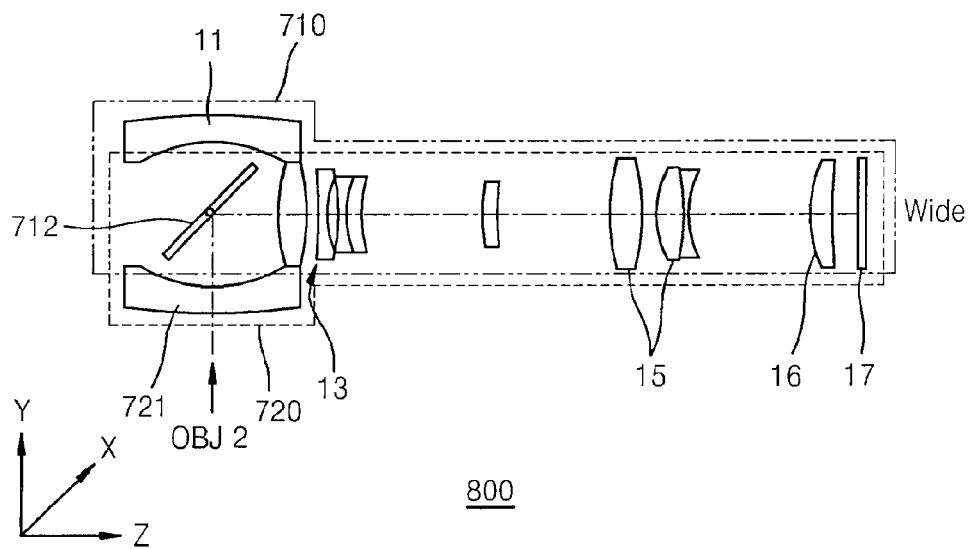
FIG. 9B illustrates a dual lens optical system in a SINGLE-FOCUS mode according to yet another embodiment of the present invention.

FIGS. 9A and 9B respectively illustrate a dual lens optical system in a wide angle mode, and in a super wide single-focus mode according to yet another embodiment of the present invention.

This embodiment is different from the embodiment illustrated in FIGS. 8A and 8B only in that the reflection member 712 is the reflection mirror not the prism. Therefore, further description of this embodiment will be omitted.

FIG. 10 schematically illustrates a dual lens camera according to embodiments of the present invention. The dual lens camera 100 includes the dual lens optical systems (10 and 20), a control unit (not shown), and a memory unit (not shown). Also, the dual lens camera 100 further includes a view finder (not shown).

The image sensor 17 of the optical system receives light representing the images of the objects OBJ 1 or OBJ 2 and converts the light to an electric signal for each pixel thereof. An electric signal output from the image sensor 17 is input to the control portion through a signal transfer unit, for example, a flexible printed circuit board (FPCB). The control portion operates and processes the signal to generate image data and may transfer the image data to the memory portion and/or the view finder as necessary.

As described above, in the dual lens camera having the dual lens optical systems 10 and 20 according to the embodiments of the present invention, since the optical systems 10 and 20 share at least some elements, the dual lens camera can be made smaller and thinner. Also, the cost for materials can be reduced.

Figure 11:
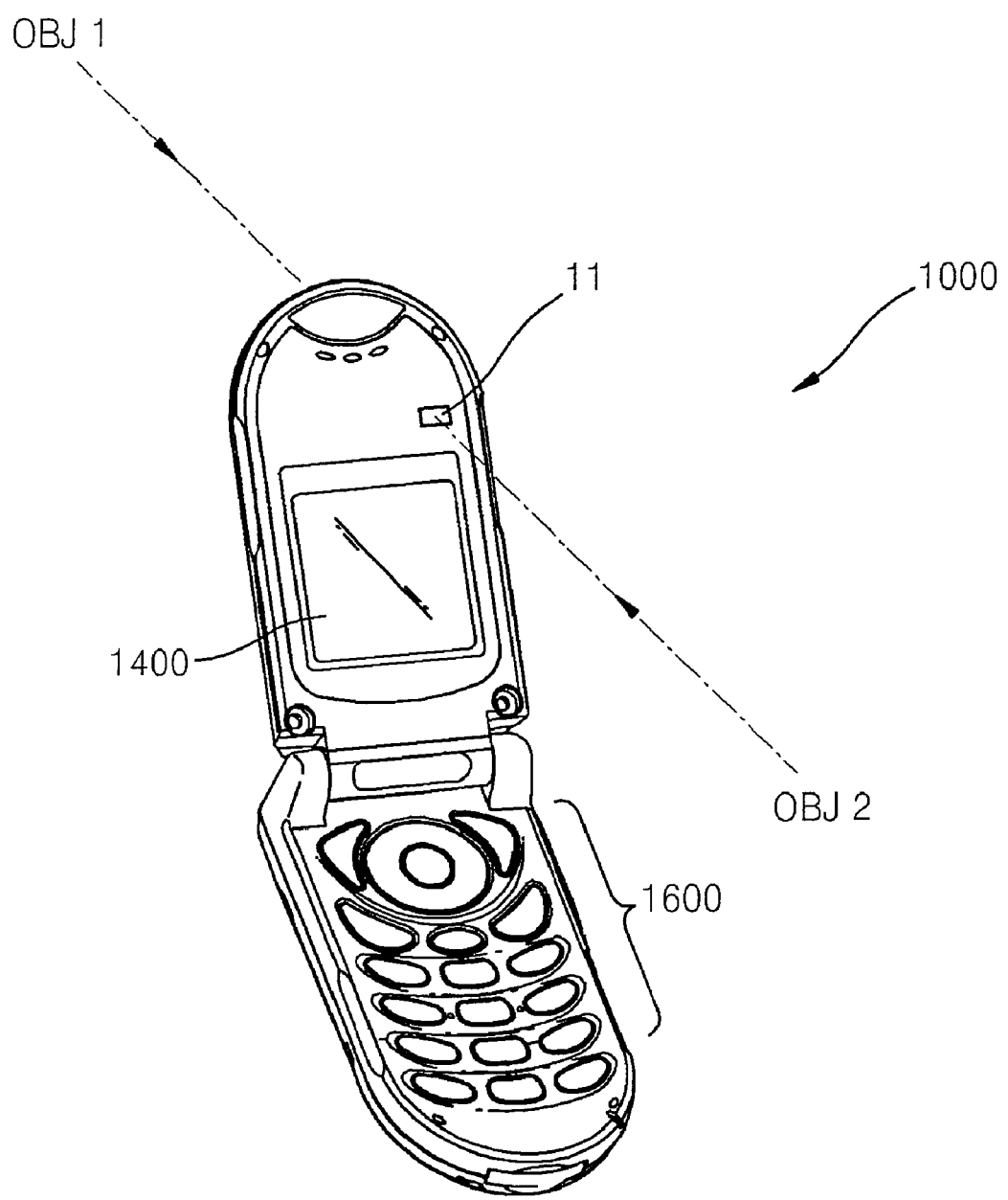
FIG. 11 illustrates a mobile camera phone incorporating a dual lens optical system according to embodiments of the present invention.

Embodiments of the dual lens optical systems illustrated in FIGS. 5 through 9 may also be applied to the mobile camera phone 1000 as depicted in FIG. 11. In the mobile camera phone 1000 having a videophony function, the first optical system with the first incident lens 11 facing outward will be used to photograph the object OBJ 1 like scenery or other people which is not a user, and the second optical system with the second incident lens facing inward or toward the object OBJ 2 like the user will be used to photograph the user for instance in a videotelephony mode.

Until now, the embodiments where the first optical system is a zoom optical system having a wide mode, a middle mode and a tele mode, and the second optical system is a super wide single-focus optical system were described. But the scope of the present invention is not limited thereto. For example, the first optical system is a single-focus optical system with a relatively long focal length, and the second optical system is another single-focus optical system with a relatively short focal length for a wider viewing angle.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are intended to be used generally and are not limited solely to mechanical embodiments. Numerous modifications and adaptations will be readily apparent to those skilled in this art without departing from the spirit and scope of the present invention.

What is claimed is:

1. An imaging device having a dual lens optical system, the device comprising:
   an image sensor;
   a first optical system having a first incident lens oriented with respect to a first side of the imaging device;
   a second optical system having a second incident lens oriented with respect to a second side of the image device; and
   a reflection member movable between a first position and a second position;
   wherein:
   when the reflection member is in the first position, a light image received via the first incident lens is redirected to a first optical axis such that the light image is focused on an imaging area of the image sensor;
   when the reflection member is in the second position, a light image received via the second incident lens is redirected to the first optical axis such that the light image is focused on the same imaging area of the image sensor; and
   at least one optical element is disposed between the image sensor and the reflection member.

2. The imaging device of claim 1, wherein the first optical system and the second optical system share only one common optical axis.

3. The imaging device of claim 1, wherein the first optical system and the second optical system include separate focusing mechanisms, each focusing mechanism independently being capable of selectively focusing light images received via respective incident lens on the image sensor.

4. An imaging device having a dual lens optical system, the device comprising a first optical system and a second optical system for selectively directing one of two light images received via two incident lenses to a first optical axis toward an image sensor by at least one reflection member;

wherein at least one optical element is disposed between an image sensor and the reflection member, and wherein the two incident lenses are arranged to face different directions.

5. The imaging device of claim 4, wherein the first optical system and the second optical system share only one common optical axis.

6. The imaging device of claim 4, wherein said at least one optical element comprises at least one zoom lens group to adjust a focal length to change a zoom ratio while moving along the first optical axis.

7. The imaging device of claim 4, wherein said at least one optical element comprises a focusing lens group arranged to move along the first optical axis so as to adjust focus of an image on the image sensor.

8. The imaging device of claim 4, wherein the two incident lenses are disposed at a corresponding location and facing opposite directions, and said at least one reflection member is a reflection member rotatable to selectively redirect two light images from the incident lenses into a first optical axis of light.

9. The imaging device of claim 4, wherein the two incident lenses are not disposed at a corresponding location and facing opposite directions, and said at least one reflection member comprises a first and second reflection members, the first reflection member being disposed at a corresponding location to a first incident lens and the second reflection member being disposed at a corresponding location to a second incident lens.

10. The imaging device of claim 9, wherein the first reflection member is a prism or a mirror, and the second reflection member is a reflection member movable to selectively reflect the light from the second incident lens while blocking light from the first incident lens.

11. The image device of claim 4, wherein the two incident lenses are provided on opposite sides of the image device.

12. The image device of claim 11, wherein the two incident lenses are disposed along a same axis.

13. The image device of claim 11, wherein the two incident lenses are disposed along different axes.

14. An imaging device having a dual lens optical system, the device comprising:

a first optical system and a second optical system adapted to respectively direct each of light images received via two incident lenses to a first optical axis toward an image sensor, one of the first optical system and the second optical system including a zoom optical system having a first zoom lens group and a second zoom lens group;

a first reflection member for directing light image from the first incident lens; and a second reflection member for directing light image from the second incident lens, the second reflection member being selectively positioned in the first optical axis between the first zoom lens group and the second zoom lens group;

wherein the two incident lenses are arranged to face different directions.

15. The imaging device of claim 14, wherein:

the first optical system comprises:

the first incident lens on which the light is incident in a direction perpendicular to the first optical axis of light;

the first reflection member redirecting an optical axis of the light incident from the first incident lens by 90°; and the first zoom lens group and the second zoom lens group for adjusting a focal length to change a zoom ratio while moving along the first optical axis to allow the light incident from the first incident lens to be formed on the image sensor;

the image sensor, and the second optical system comprises:

the second incident lens on which the light is incident in a direction perpendicular to the first optical axis;

the movable reflection member selectively positioned in the first optical axis of light between the first zoom lens group and the second zoom lens group to allow the light incident from the second incident lens to be formed on the image sensor; and the second zoom lens group disposed between the movable reflection member and the image sensor.

16. The imaging device of claim 14, wherein at least one lens of the second zoom lens group comprises a focusing lens for adjusting focus so that the light is well formed on the image sensor.

17. The imaging device of claim 14, wherein the first optical system and the second optical system share a focusing lens group arranged to move along the first optical axis between the second zoom lens group and the image sensor so as to adjust focus an image on the image sensor.

18. An imaging device comprising:

two incident lenses; and at least one movable reflection member for selectively directing one of two light images received via a first optical system or a second optical system toward an image sensor;

wherein at least one lens is disposed between the image sensor and the movable reflection member, and wherein the two incident lenses are arranged to face different directions.

19. The imaging device of claim 18, wherein:

the first optical system comprises:

a first incident lens on which the light is incident in a direction perpendicular to the first optical axis of light;

a first reflection member for redirecting an optical axis of the light incident from the first incident lens by 90°; and a first zoom lens group and the second zoom lens group adjusting a focal length to change a zoom ratio while moving along the first optical axis to allow the light incident from the first incident lens to be formed on the image sensor;

the image sensor, and the second optical system comprises:

a second incident lens on which the light is incident in a direction perpendicular to the first optical axis;

a movable reflection member selectively positioned in the first optical axis of light between the first zoom lens group and the second zoom lens group to allow the light incident from the second incident lens to be formed on the image sensor; and a second zoom lens group disposed between the movable reflection member and the image sensor.

20. The imaging device of claim 18, wherein at least one lens of the second zoom lens group is a focusing lens adjusting focus so that the light image is well formed on the image sensor.

21. The imaging device of claim 18, wherein the first optical system and the second optical system share a focusing lens group arranged to move along the first optical axis between the second zoom lens group and the image sensor so as to adjust focus an image on the image sensor.

22. The imaging device of claim 18, wherein said at least one lens is to be with at least one of zoom or focus function.

23. An imaging device comprising:
   an image sensor;
   two incident lenses;
   a first optical system having a non-movable reflection member for redirecting a light image towards the image sensor; and
   a second optical system having a movable reflection member for selectively redirecting a light image from the second optical system towards the image sensor;
   wherein:
   the movable reflection member is disposed between the non-movable reflection member and the image sensor;
   at least one optical element is disposed between the image sensor and the movable reflection member; and
   the two incident lenses are facing the different directions.

24. The imaging device of claim 23, wherein:
   the first optical system comprises:
   a first incident lens on which the light is incident in a direction perpendicular to a first optical axis of light;
   the non-movable first reflection member for redirecting an optical axis of the light incident from the first incident lens by 90°; and
   a first zoom lens group and a second zoom lens group for adjusting a focal length to change a zoom ratio while moving along the first optical axis to allow the light incident from the first incident lens to be formed on the image sensor; and
   the second optical system comprises:
   a second incident lens on which the light is incident in a direction perpendicular to the first optical axis;
   the movable reflection member selectively positioned in the first optical axis of light between the first zoom lens group and the second zoom lens group to allow the light incident from the second incident lens to be formed on the image sensor; and
   the second zoom lens group disposed between the movable member and the image sensor.

25. The imaging device of claim 23, wherein at least one lens of the second zoom lens group is a focusing lens adjusting focus so that the light image is well formed on the image sensor.

26. The imaging device of claim 23, wherein the first optical system and the second optical system share a focusing lens group arranged to move along the first optical axis between the second zoom lens group and the image sensor so as to adjust focus of an image on the image sensor.

27. The imaging device of claim 23, wherein said at least one lens is associated with at least one of zoom or focus function.

* * * * *